United States Patent [19]

Steiner et al.

[11] 4,320,710

[45] Mar. 23, 1982

[54] GRATE MECHANISM FOR INCINERATING FURNACES

[75] Inventors: Hansruedi Steiner, Wettingen; Arnold Erbsland, Geroldswil, both of Switzerland

[73] Assignee: Widmer & Ernst AG, Wettingen, Switzerland

[21] Appl. No.: 129,624

[22] Filed: Mar. 12, 1980

[30] Foreign Application Priority Data

Mar. 14, 1979 [CH] Switzerland ............... 2416/79

[51] Int. Cl.³ .................................................. F23N 7/08
[52] U.S. Cl. .................................... 110/281; 110/255; 198/773; 414/156
[58] Field of Search ............... 110/281, 282, 283, 255; 198/750, 773, 952; 414/150, 156

[56] References Cited

U.S. PATENT DOCUMENTS

| 1,818,661 | 8/1931 | Weigel | 110/281 |
| 1,897,579 | 2/1933 | Kohout | 110/281 |
| 2,695,575 | 11/1954 | Gough | 110/282 |
| 3,985,084 | 10/1976 | Delaplace | 110/281 |

FOREIGN PATENT DOCUMENTS 724958 9/1942 Fed. Rep. of Germany ...... 110/282

*Primary Examiner*—Edward G. Favors
*Attorney, Agent, or Firm*—Toren, McGeady & Stanger

[57] ABSTRACT

A grate assembly for a furnace for incinerating material comprises rows of moving grate bars which are arranged between rows of stationary grate bars and which are individually driven by drives arranged exteriorly of a combustion zone located beneath the rows of grate bars. Interposed between the grate bars and the drive are a lever system including a swivel lever fastened to a torsion shaft and a slide guide attachment for effecting approximately rectilinear movement of the moving grate bars. The torsion shaft is supported on sidewalls of the combustion zone and is rotatable and slideable by means of a bearing support which pivots about a shaft. Due to the approximately rectilinear movement and the optional, individual adjustment of the movement of adjacent moving rows of grate bars, the incineration behaviour of the material may be taken into consideration to a large extent and the drives may be easily maintained since they are readily accessible.

7 Claims, 8 Drawing Figures

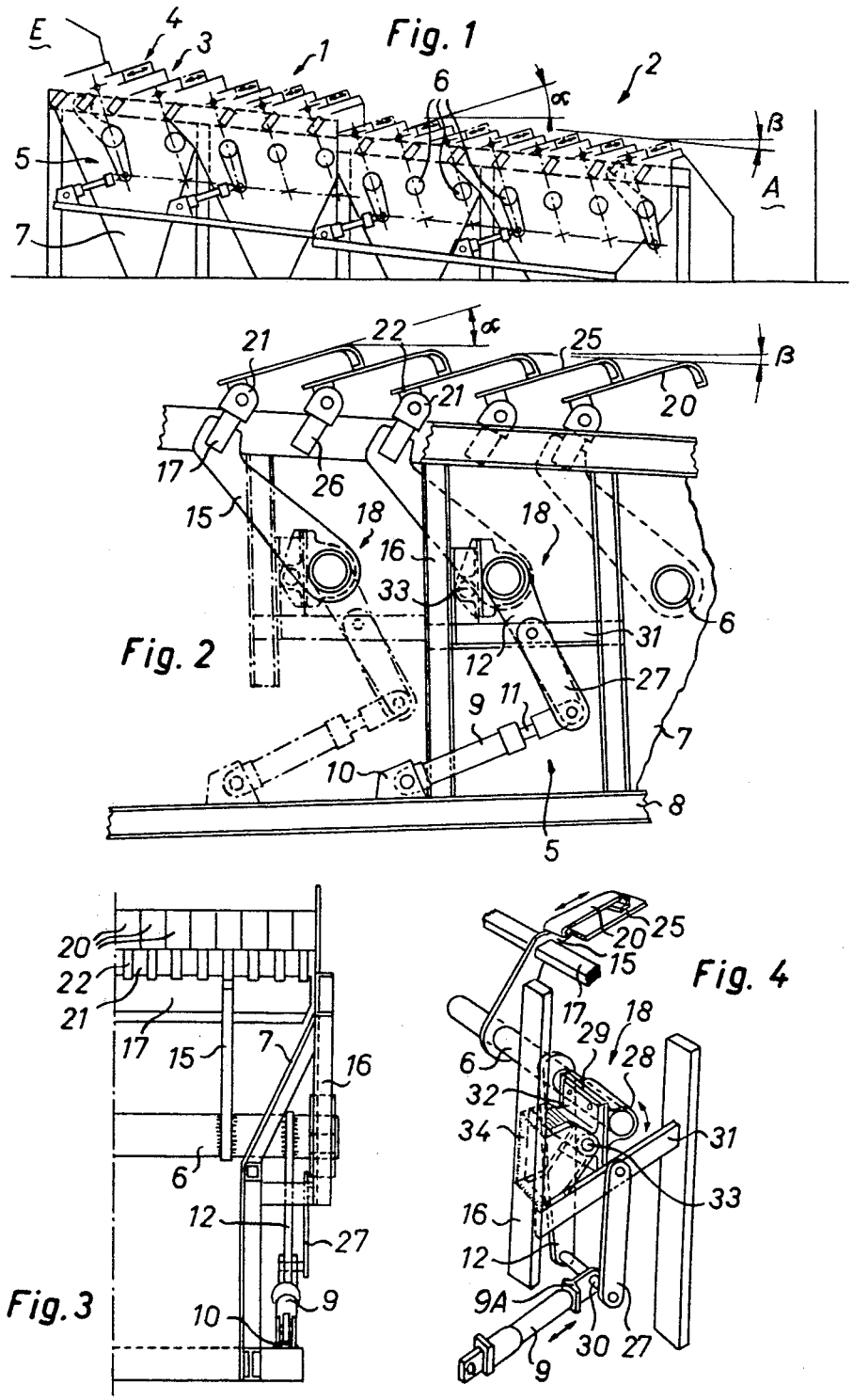

GRATE MECHANISM FOR INCINERATING FURNACES

The present invention relates generally to furnaces useful particularly for the incineration of garbage and more specifically to a grate mechanism for such an incinerating furnace.

The furnaces of the type to which the present invention relates usually consist of at least one grate track or area which is composed of rows of stationary and moving grate bars, with each row being provided with a plurality of obliquely inclined grate bars arranged in juxtaposed overlapping position in the direction of flow of material through the furnace. A drive mechanism which is provided with a swivel lever system for actuating the moving grate bars is arranged on a torsion shaft which extends exteriorly of a combustion zone located beneath the grate bar rows.

Grates known from German Auslegeschrifts Nos. 24 46 724 and 25 47 155 are arranged to decline in the direction of flow of the material which is to be incinerated and they are constructed as feed grates with rows of stationary and moving grate bars. The rows of moving grate bars are essentially comprised of a plurality of rows combined and actuated by a single drive unit. This results in the possibility that movement of the grate bars would be limited and restricted so that an ideal adjustment of the incineration behavior of the furnace relative to the particular material to be processed may not be achieved. Since many of the moving elements of the drive mechanisms, such as bearings, support or guide elements and the like, used for actuating the rows of moving grate bars are arranged in the vicinity of the combustion chamber, and since in this zone they are subjected to increased susceptability to damage, further limitations in the effectiveness of movement of the grate bar rows must be encountered.

The present invention is directed toward the task of providing a grate mechanism of the type described above which will enable utilization of a drive mechanism for actuation of the rows of moving grate bars which is simple and reliable in operation. In the present invention, the rows of moving grate bars may be optionally driven either individually or coupled together for adjustment of the incineration behavior of the furnace in accordance with the material to be processed. This makes it possible to synchronously move successive rows of moving grate bars within a grate area forwardly and in opposite directions with time delay or in any selected sequence.

SUMMARY OF THE INVENTION

Briefly, the present invention may be described as a grate assembly for a furnace for incinerating material comprising grate means composed of stationary and moving grate bars arranged in rows, the grate bars essentially consisting of a plurality of obliquely inclined grate bars juxtaposed in overlapping relationship in the direction of material flow through the furnace. A combustion zone is defined beneath the grate means and drive means are provided for actuating the moving grate bars. A lever system including swivel lever means is interposed between the drive means and the moving grate bars and a torsion shaft interposed between the lever system and the grate bars extends to the exterior of the combustion zone and is connected to the swivel lever means. A slide guide attachment is interposed between the grate bars and the drive means with the slide guide attachment and the drive means being located exteriorly of the combustion zone. In accordance with the present invention, the disadvantages of the prior art are overcome in that the torsion shaft which may be rotated by means of the swivel lever of the swivel lever system and the drive means, which may for example be a hydraulic cylinder, is provided with the slide guide attachment for effecting approximately rectilinear movement of the moving grate bars. With the elements arranged outside of the combustion zone, improved operation and easier maintenance is enabled.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is a schematic side view illustrating a grate mechanism in accordance with the invention;

FIG. 2 is an enlarged view showing in greater detail the mechanism of FIG. 1;

FIG. 3 is a partial front view showing portions of the assembly of FIG. 2; and

FIGS. 4 through 8 are perspective views showing various embodiments of drive lever systems for generating approximate rectilinear movement of the grate bars of the mechanism of the invention.

DETAILED DESCRIPTION OF THE PREFERRED EMBODIMENTS

Figure 5:
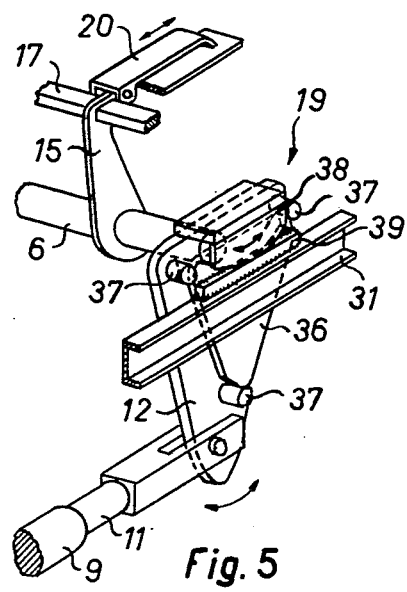

Referring now to the drawings wherein similar parts are referred to with like reference numerals throughout the various figures thereof, a furnace having a grate system structured in accordance with the present invention is shown in FIGS. 1 and 2. The furnace has an inlet zone E and a discharge chute A in order that material to be incinerated may be fed into the furnace and discharged after treatment. The furnace as shown in FIG. 1 is essentially formed with two grate sections or stages 1 and 2 which are arranged in a step-wise manner in the direction of flow of material through the furnace with a downwardly directed slope $\beta$ taken relative to the horizontal. The grate stages are composed of individual grate bars which are arranged in rows of grate bars, with alternate rows being formed of stationary and moving grate bars. The furnace shown in FIG. 1 comprises rows of moving grate bars 4 and rows of stationary grate bars 3. The rows of moving grate bars are indicated with a double arrow identifying the general direction of movement thereof.

The rows of moving grate bars 4 are actuated by drive means, with only a few of these drive means being schematically illustrated in the drawings for improved clarity. The drive means will be explained in greater detail in connection with the description of FIGS. 4–8.

In FIG. 1 there is shown drive means 5 provided with a lever system interposed between the drive means 5 and a torsion shaft 6. As seen in FIG. 1, the torsion shafts 6 operate to actuate the rows of moving grate bars 4 and a total of twelve torsion shafts are provided.

The grate assembly depicted in the drawing represents a portion of the furnace of the invention and the rows of grate bars 3 and 4 form the upper boundary for a lower combustion zone located beneath the grate bar rows, with the combustion zone being bounded on either side by a wall 7 which closes this zone. Due to the fact that the torsion shafts 6 extend through the sidewalls 7, it then becomes possible to arrange the drive means 5 on the exterior of the combustion zone located beneath the grate bar rows. As a result, it is possible with the present invention to locate all of the parts which require maintenance, for example, bearings, guide means and joints of the lever system, in a location where they will be easily accessible and therefore easy to maintain. The torsion shafts 6 extending through the sidewalls 7 may be easily and reliably sealed to the sidewall 7 in order to close off the combustion chamber by, for example, appropriate means such as a bellows seal. Because of these advantages, it is also possible to provide an individual drive means 5 for each of the rows of moving grate bars 4 and it is also possible to simultaneously achieve increased reliability in the operation of the device.

The arrangement of the drive means is depicted in greater detail in FIGS. 2 and 3. Upon a foundation frame 8 of the grate, there are provided lifting devices which may for example comprise hydraulic lifting cylinder means 9 which are pivotally supported upon a base 10. A piston rod 11 of the lifting cylinders 9 acts upon a swivel lever 12 which is fastened to the torsion shaft 6. Push levers 15 are fastened to the torsion shaft 6 with only one of these push levers being shown in FIG. 3. The torsion shaft 6 is mounted in a bearing support and, in addition to a rotational movement, it is also able to perform a sliding movement.

The push levers 15 support a grate beam 17 which extends over the entire length of the row 4 of movable grate bars and upon which there is fastened a grate bar holder 21 for each of the grate bars 20. Each movable grate bar 20 is provided with a support plate 22 by means of which it is pivotally supported in the grate bar holder.

The stationary grate bars 25 of the rows 3 of stationary grate bars are fastened in a similar manner to a grate beam 26 which is supported on the frame of the grate assembly.

When the lifting cylinder 9 is actuated, the end of the push lever 15 will perform a quasilinear movement which is achieved by means of a straight-line or slide guide attachment mechanism 18, best seen in FIG. 4.

The swivel lever 12, a plate 9a fastened on the piston rod of the lifting cylinder 9 and an auxiliary lever 27 are connected to each other by means of a pin 30. While the swivel lever 12 is connected to a torsion shaft 6, the auxiliary lever 27 is pivotally supported on a frame 31 which, in turn, is supported on the sidewall 7 by means of a support 16.

Upon actuation of the lifting cylinder 9, the auxiliary lever 27 will impose upon the swivel movement of the swivel lever 12 an additional movement so that the torsion shaft 6 will perform a shifting movement in addition to the rotational movement. The additional shifting movement of the torsion shaft 6 will result in approximately linear movement of the end of the push lever 15 and, thus, also of the moving grate bar 20.

FIG. 5 shows a straight-line or slide guide attachment mechanism 19 by means of which the linear movement of the grate beam 17 and the grate bar 20 is achieved. Upon actuation of the lifting cylinder 9, the piston rod 11 swivels the swivel lever 12 and thus rotates the torsion shaft 6. The additional shifting movement of the torsion shaft 6 is achieved by means of a curved guide or crank 38 which rolls upon a plane surface 39 and supports the swivel lever 12. Centering is achieved by means of a guide plate 36 which is fastened to a frame 31 and upon which three rollers 37 are rotatably guided on the swivel lever 12.

Figure 6:
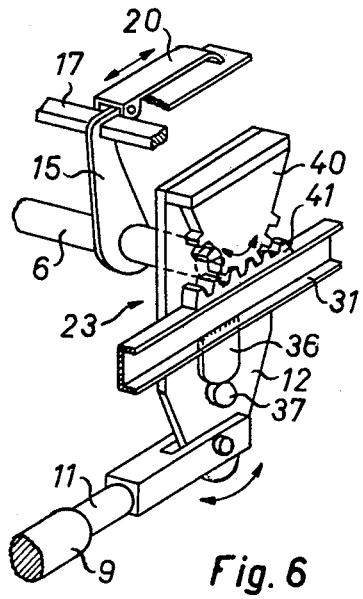

In FIG. 6 there is illustrated another mechanism 23 by means of which the linear movement of the grate bar 20 may be achieved. The swivel lever 12 fastened to the torsion shaft is connected to a toothed wheel portion 40 having teeth which mesh with the teeth of a rack 41 and is, in addition, provided on a stationary guide plate 36 by means of a roller 37. Upon actuation of the lifting cylinder 9, an approximately linear movement of the grate bar 20 is likewise achieved in the case of the embodiment of FIG. 6.

Figure 7:
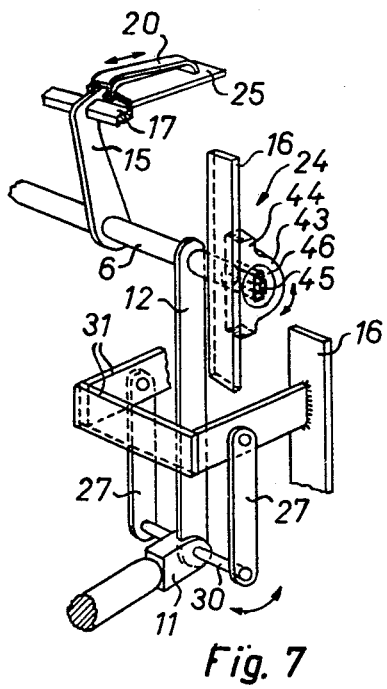

In FIG. 7 there is shown another mechanism 24 for achieving a linear movement of the grate bar 20 which is similar to the mechanism shown in FIG. 4. In addition to the swivel lever 12, two auxiliary levers 27 which are pivotally supported on the frame 31 are connected to the piston rod 11 by means of a pin 30 while the torsion shaft 6 connected to the swivel lever 12 is rotatably supported in a bearing housing 43 by means of a bolt 46 provided with a slot 45. The torsion shaft 6 is capable of performing a shifting movement in the slot 45. The bearing housing 43 is fastened to the support 16 by means of a bearing plate 44. When the swivel lever 12 is swiveled, auxiliary levers 27 impose an additional shifting movement upon the torsion shaft 6 in the slot 45 so that the approximately linear movement of the grate bar 20 will also be achieved in this case.

Figure 8:
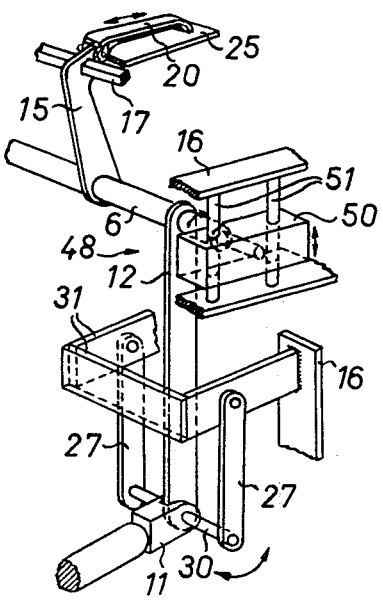

The straight-line mechanism 48 illustrated in FIG. 8 is similar to that depicted in FIGS. 4 and 7 in that the same auxiliary lever or levers 27 are used in this arrangement. The difference resides in the support of the torsion shaft 6. In FIG. 8, the torsion shaft 6 is rotatably supported in a bearing block 50. The bearing block 50 is, in turn, movably guided in two guides 51. The two directions of movement of the bearing block 50 are indicated by a double arrow in FIG. 8, these movements being superimposed upon the rotational movement of the torsion shaft 6 imparted by the swivel lever 12 so that an approximately linear movement of the grate beam 17 or of the coupling point with the grate bar 20 is achieved.

An important aspect of the grate system described above is that, by means of the lever systems illustrated in FIGS. 4–8 and described above, an essentially rectilinear movement of the grate bar holder 21 parallel to the plane of movement of the grate bars 20 at an angle $\alpha$ (FIG. 1) relative to the horizontal is achieved by means of a single lifting cylinder. Through the rectilinear movement, on the one hand, and the individual actuation of the moving grate bars 20, on the other hand, the grate assembly can be adjusted in an optimum manner to the incineration behavior or characteristics of the respective materials to be incinerated by the furnace.

While specific embodiments of the invention have been shown and described in detail to illustrate the application of the inventive principles, it will be understood that the invention may be embodied otherwise without departing from such principles.

What is claimed is:

1. A grate assembly for a furnace for incinerating material comprising: grate means composed of stationary and moving grate bar means arranged in rows and inclined at an angle of inclination relative to the horizontal, said grate bar means including a plurality of obliquely inclined grate bars juxtaposed in overlapping relationship in the direction of material flow through said furnace; means defining a combustion zone beneath said grate means; a torsion shaft having said moving grate bar means attached thereto and extending from beneath said grate means within said combustion zone to the exterior of said combustion zone; drive means located on the exterior of said combustion zone for actuating said moving grate bar means through said torsion shaft; a lever system including swivel lever means interposed between said drive means and said torsion shaft on the exterior of said combustion zone; and slide guide attachment means interposed with said lever system between said drive means and said torsion shaft on the exterior of said combustion zone; said drive means operating through coordination of said torsion shaft, said swivel lever means and said slide guide attachment means to impart to said moving grate bar means an approximately linear movement in the direction of inclination of said moving grate bar means.

2. An assembly according to claim 1 wherein said grate means include a grate beam having said grate bars supported thereon and a push lever for supporting said grate beams fastened on said torsion shaft, said slide guide attachment means being provided with a shorter auxiliary lever fixedly supported parallel with said swivel lever.

3. An assembly according to claim 2 wherein said torsion shaft is rotatably supported in a bearing housing which is pivotally supported about a fixed supported shaft.

4. A grate assembly according to claim 1 wherein said slide guide attachment means comprises stationary rolling surface means which supports said torsion shaft through a convexly shaped guide member and wherein said swivel lever means is guided by rollers on a stationary guide member.

5. A grate assembly according to claim 1 wherein said slide guide attachment means comprises a toothed wheel portion which is connected with said swivel lever means and which interacts with a rack, said toothed wheel portion being guided upon a stationary guide member by roller means.

6. A grate assembly according to claim 2 wherein said slide guide attachment means comprises a stationary bearing housing which rotatably supports said torsion shaft by bolt means, and wherein said bolt means has a diagonally extending slot within which said torsion shaft is slideably guided.

7. A grate assembly according to claim 2 wherein said slide guide attachment means comprises a bearing block which supports said torsion shaft and is slideably guided by guide means.

* * * * *